US012252375B2

(12) United States Patent
Pounds et al.

(10) Patent No.: US 12,252,375 B2
(45) Date of Patent: Mar. 18, 2025

(54) HOSE REEL SYSTEM

(71) Applicant: Tanner Pounds, Lubbock, TX (US)

(72) Inventors: Tanner Pounds, Idalou, TX (US); Warren Merrell, Idalou, TX (US); Jason Payne, Idalou, TX (US)

(73) Assignee: Tanner Pounds, Idalou, TX (US)

( * ) Notice: Subject to any disclaimer, the term of this patent is extended or adjusted under 35 U.S.C. 154(b) by 142 days.

(21) Appl. No.: 17/680,133

(22) Filed: Feb. 24, 2022

(65) Prior Publication Data

US 2022/0267117 A1 Aug. 25, 2022

Related U.S. Application Data

(60) Provisional application No. 63/153,355, filed on Feb. 24, 2021.

(51) Int. Cl.

*B65H 75/44* (2006.01)
*B05B 7/24* (2006.01)
*B05B 7/00* (2006.01)

(52) U.S. Cl.

CPC ........... *B65H 75/4478* (2013.01); *B05B 7/24* (2013.01); *B65H 75/4431* (2013.01); *B65H 75/4471* (2013.01); *B65H 75/4489* (2013.01); *B05B 7/0018* (2013.01); *B65H 2701/33* (2013.01)

(58) Field of Classification Search

CPC .......... B65H 75/4478; Y10T 137/6921; B05B 7/0018; B05B 7/024

See application file for complete search history.

(56) References Cited

U.S. PATENT DOCUMENTS

| | | | | |
|---|---|---|---|---|
| 2,606,067 A * | 8/1952 | Roark | B65H 75/48 | 242/378 |
| 2,640,724 A * | 6/1953 | Wiens | B60S 3/044 | 242/379.2 |
| 3,467,134 A * | 9/1969 | Becker | F16L 39/04 | 137/355.17 |
| 3,552,425 A * | 1/1971 | Olson | B65H 75/38 | 187/413 |
| 3,709,252 A * | 1/1973 | Bishop | B66F 9/205 | 137/355.17 |
| 4,543,982 A | 10/1985 | Wolfe | | |
| 4,813,627 A | 3/1989 | Nelson | | |
| 7,717,357 B2 | 5/2010 | Gantenbein | | |
| 10,155,239 B2 | 12/2018 | Sander | | |
| 10,442,658 B2 | 10/2019 | Sevigny | | |

* cited by examiner

*Primary Examiner* — Kevin F Murphy
(74) *Attorney, Agent, or Firm* — Shannon Warren

(57) ABSTRACT

A reel system comprising a spool support, a belt drive assembly, a center shaft assembly, and one or more spool cross support bars. The reel system further comprises two spool side members having a first spool side member and a second spool side member. A spool portion comprises the two spool side members, the center shaft assembly and the one or more spool cross support bars. The spool portion is configured to mount between a first side support, a second side support. The spool portion is configured to rotate around a spool axis. The belt drive assembly comprises a drive system, and a belt. The drive system comprises a pneumatic pump driven drive system. The drive system comprises a drive shaft.

18 Claims, 13 Drawing Sheets

PRIOR ART

PRIOR ART

HOSE REEL SYSTEM

CROSS-REFERENCE TO RELATED APPLICATIONS

This application claims benefit to U.S. provisional patent application No. 63/153,355 filed on 2021 Feb. 24.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

In recent years, spray foam has been introduced to improve efficiency and thermal performance of homes and buildings. As a result, an opportunity has arisen for workmen to learn a new trade and support themselves by spraying foam for hire. The equipment used to spray foam is complex and requires lengthy set up and teardown procedures when arriving and departing a worksite. Since worksites are often in different sites, the equipment must be mobile and is often attached to a trailer.

Further complicating matters is the distance between equipment kept on a trailer and that which is brought to the point of application with a nozzle. See FIG. 2 for an illustration of this complexity, noting that the portion of a plurality of lines 236 in one or more line wraps 234 may extend for hundreds or thousands of feet.

When a workman has completed a job, said plurality of lines 236 and or two hoses 300 are often merely tossed on a trailer or other portions of a vehicle which can lead to tangles and complications for set up and teardown.

Since there are so many lines (said plurality of lines 236) to contend with, traditional spooling systems are not suitable as portions of said plurality of lines 236 are for fluids, others are electrical or air lines. Traditional spools would twist up a proximate end of said plurality of lines 236 to allow the distal end of said plurality of lines 236 to spool and unspool.

In some cases, teardown and storage of hoses can take 10-30 minutes after a service call. Partially, this time is associated with the effort required to straighten out the hoses to drag them onto a trailer. By allowing for a spool to wind up hoses is a labor savings. Further, by adding a drive system to automatically wind the hoses, labor and time can be saved. Likewise, equipment can be protected by proper storage between uses.

The current application discloses and claims an improvement to the art and a solution to the storage, setup and teardown of spray foam system, which saves time for workmen, protects equipment and improves safety in the process.

Examples of spool systems include US20040121912A1, U.S. Pat. Nos. 10,155,239B2, 7,717,357B2, 4,813,627A, 4,543,982A, 10,442,658B2. Notwithstanding these examples, none of the prior art whether individually or in combination are seen to anticipate the current system.

BRIEF SUMMARY OF THE INVENTION

A reel system for speeding up setup and teardown of a foam spraying system while increasing safety and protecting equipment. Said reel system comprises a spool support, and a spool portion. Said spool portion comprises a center shaft assembly, two spool side members having a first spool side member and a second spool side member. Said spool portion is configured to rotate around a spool axis, wherein said spool portion rotates about said spool axis. Said center shaft assembly comprises a first end and a second end, each rotatably supported by a bearing-coupling assembly. each end of said center shaft assembly comprises shaft-end fluid input. Said first end of said center shaft assembly comprises a first shaft-end fluid input and said second end of said center shaft assembly comprises a second shaft-end fluid input. Said first shaft-end fluid input is configured to receive a first fluid and said second shaft-end fluid input is configured to receive a second fluid. Said center shaft assembly comprises a shaft portion being between said two spool side members. Said center shaft assembly comprises two or more fluid outputs in said shaft portion. Said two or more fluid outputs comprise a first fluid output, and a second fluid output. Said reel system is configured to receive said first fluid and said second fluid at opposite ends of said center shaft assembly in said first shaft-end fluid input and said second shaft-end fluid input and deliver them to said first fluid output and said second fluid output, respectively. Said two or more fluid outputs are located in said shaft portion to allow a first end of two hoses to connect to and rotate with said center shaft assembly. each among said bearing-coupling assembly comprises a bearing, and a fluid input coupler. Said center shaft assembly is configured to slide through and rotate within said bearing. each among said bearing-coupling assembly comprises said fluid input coupler to allow said shaft-end fluid input to connect to a fluid reservoir line and receive fluids into a portion of said center shaft assembly. Said fluid input coupler is configured for selectively attaching to said fluid reservoir line, allowing said bearing and said center shaft assembly to rotate relative to said fluid input coupler, and containing a fluid input channel between said fluid reservoir line and said center shaft assembly. each among said fluid reservoir line is configured to create a fluid connection between one among two fluid reservoirs and said shaft-end fluid input. Said reel system is configured to setup said foam spraying system by: unwinding one or more line wraps from said spool portion, and retaining an attachment between said fluid reservoir line from said two fluid reservoirs and said center shaft assembly. Said reel system is configured to disengage and store said foam spraying system after use at a worksite by: winding a plurality of lines around said spool portion, and retaining an attachment between said fluid reservoir line from said two fluid reservoirs and said center shaft assembly.

Said reel system for speeding up setup and teardown of said foam spraying system while increasing safety and protecting equipment. Said reel system comprises said spool support, and said spool portion. Said spool portion comprises said center shaft assembly, said two spool side members having said first spool side member and said second spool side member. Said spool portion is configured to rotate around said spool axis, wherein said spool portion rotates about said spool axis. Said center shaft assembly comprises said first end and said second end, each rotatably supported by said bearing-coupling assembly. each end of said center shaft assembly comprises said shaft-end fluid input. Said first end of said center shaft assembly comprises said first shaft-end fluid input and said second end of said center shaft assembly comprises said second shaft-end fluid input. Said first shaft-end fluid input is configured to receive said first fluid and said second shaft-end fluid input is configured to receive said second fluid. Said center shaft assembly comprises said shaft portion being between said two spool side members. Said center shaft assembly comprises said two or more fluid outputs in said shaft portion. Said two or more fluid outputs comprise said first fluid output, and said second fluid output. Said reel system is configured to receive said first fluid and said second fluid at opposite ends of said center shaft assembly in said first shaft-end fluid input and said second shaft-end fluid input and deliver them to said first fluid output and said second fluid output, respectively. Said two or more fluid outputs are located in said shaft portion to allow a first end of said two hoses to connect to and rotate with said center shaft assembly. each among said bearing-coupling assembly comprises said bearing, and said fluid input coupler. Said center shaft assembly is configured to slide through and rotate within said bearing. each among said bearing-coupling assembly comprises said fluid input coupler to allow said shaft-end fluid input to connect to said fluid reservoir line and receive fluids into a portion of said center shaft assembly. Said fluid input coupler is configured for selectively attaching to said fluid reservoir line, allowing said bearing and said center shaft assembly to rotate relative to said fluid input coupler, and containing said fluid input channel between said fluid reservoir line and said center shaft assembly. each among said fluid reservoir line is configured to create a fluid connection between one among said two fluid reservoirs and said shaft-end fluid input. a portion of said two spool side members comprise one or more spool side-inputs. each among said one or more spool side-inputs comprises an exterior input connector attached to outside surface and an internal line connector on inside surface. Said one or more spool side-inputs are configured to selectively connect to one or more lines associated with said foam spraying system. Said reel system is configured to setup said foam spraying system by: unwinding said one or more line wraps from said spool portion, receiving and selectively attaching to lines from a controller, a generator, a compressor to said one or more spool side-inputs, and retaining an attachment between said fluid reservoir line from said two fluid reservoirs and said center shaft assembly. Said reel system is configured to disengage and store said foam spraying system after use at a worksite by: detaching lines connected to said controller, said generator and said compressor from said one or more spool side-inputs, winding said plurality of lines around said spool portion, and retaining an attachment between said fluid reservoir line from said two fluid reservoirs and said center shaft assembly.

A method of speeding up setup and teardown of said foam spraying system while increasing safety and protecting said reel system. Said reel system is configured to setup said foam spraying system by: unwinding said one or more line wraps from said spool portion, receiving and selectively attaching to lines from said controller, said generator, said compressor to said one or more spool side-inputs, and retaining an attachment between said fluid reservoir line from said two fluid reservoirs and said center shaft assembly. Said reel system is configured to disengage and store said foam spraying system after use at a worksite by: detaching lines connected to said controller, said generator and said compressor from said one or more spool side-inputs, winding said plurality of lines around said spool portion, and retaining an attachment between said fluid reservoir line from said two fluid reservoirs and said center shaft assembly. Said reel system comprises said spool support, and said spool portion. Said spool portion comprises said center shaft assembly, said two spool side members having said first spool side member and said second spool side member. Said spool portion is configured to rotate around said spool axis, wherein said spool portion rotates about said spool axis. Said center shaft assembly comprises said first end and said second end, each rotatably supported by said bearing-coupling assembly. each end of said center shaft assembly comprises said shaft-end fluid input. Said first end of said center shaft assembly comprises said first shaft-end fluid input and said second end of said center shaft assembly comprises said second shaft-end fluid input. Said first shaft-end fluid input is configured to receive said first fluid and said second shaft-end fluid input is configured to receive said second fluid. Said center shaft assembly comprises said shaft portion being between said two spool side members. Said center shaft assembly comprises said two or more fluid outputs in said shaft portion. Said two or more fluid outputs comprise said first fluid output, and said second fluid output. Said reel system is configured to receive said first fluid and said second fluid at opposite ends of said center shaft assembly in said first shaft-end fluid input and said second shaft-end fluid input and deliver them to said first fluid output and said second fluid output, respectively. Said two or more fluid outputs are located in said shaft portion to allow a first end of said two hoses to connect to and rotate with said center shaft assembly. each among said bearing-coupling assembly comprises said bearing, and said fluid input coupler. Said center shaft assembly is configured to slide through and rotate within said bearing. each among said bearing-coupling assembly comprises said fluid input coupler to allow said shaft-end fluid input to connect to said fluid reservoir line and receive fluids into a portion of said center shaft assembly. Said fluid input coupler is configured for selectively attaching to said fluid reservoir line, allowing said bearing and said center shaft assembly to rotate relative to said fluid input coupler, and containing said fluid input channel between said fluid reservoir line and said center shaft assembly. each among said fluid reservoir line is configured to create a fluid connection between one among said two fluid reservoirs and said shaft-end fluid input.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
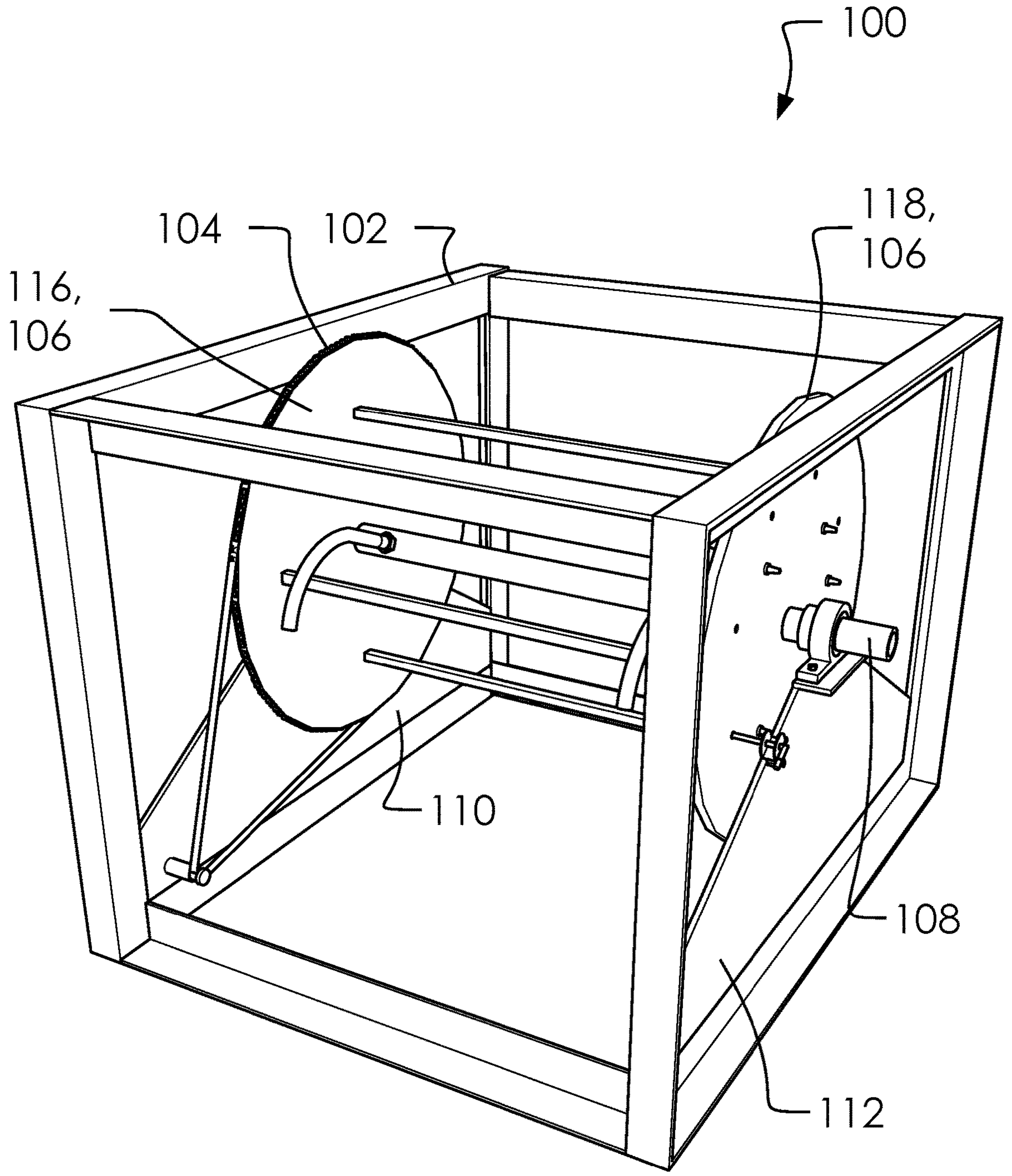
FIG. 1 illustrates a perspective overview of a reel system 100.

FIG. 1 illustrates a perspective overview of a reel system 100.

In one embodiment, said reel system 100 can comprise a spool support 102, a belt drive assembly 104, two spool side members 106, a center shaft assembly 108, a first side support 110, a second side support 112, and one or more spool cross support bars 114.

Said two spool side members 106 can comprise a first spool side member 116 and a second spool side member 118.

Figure 2:
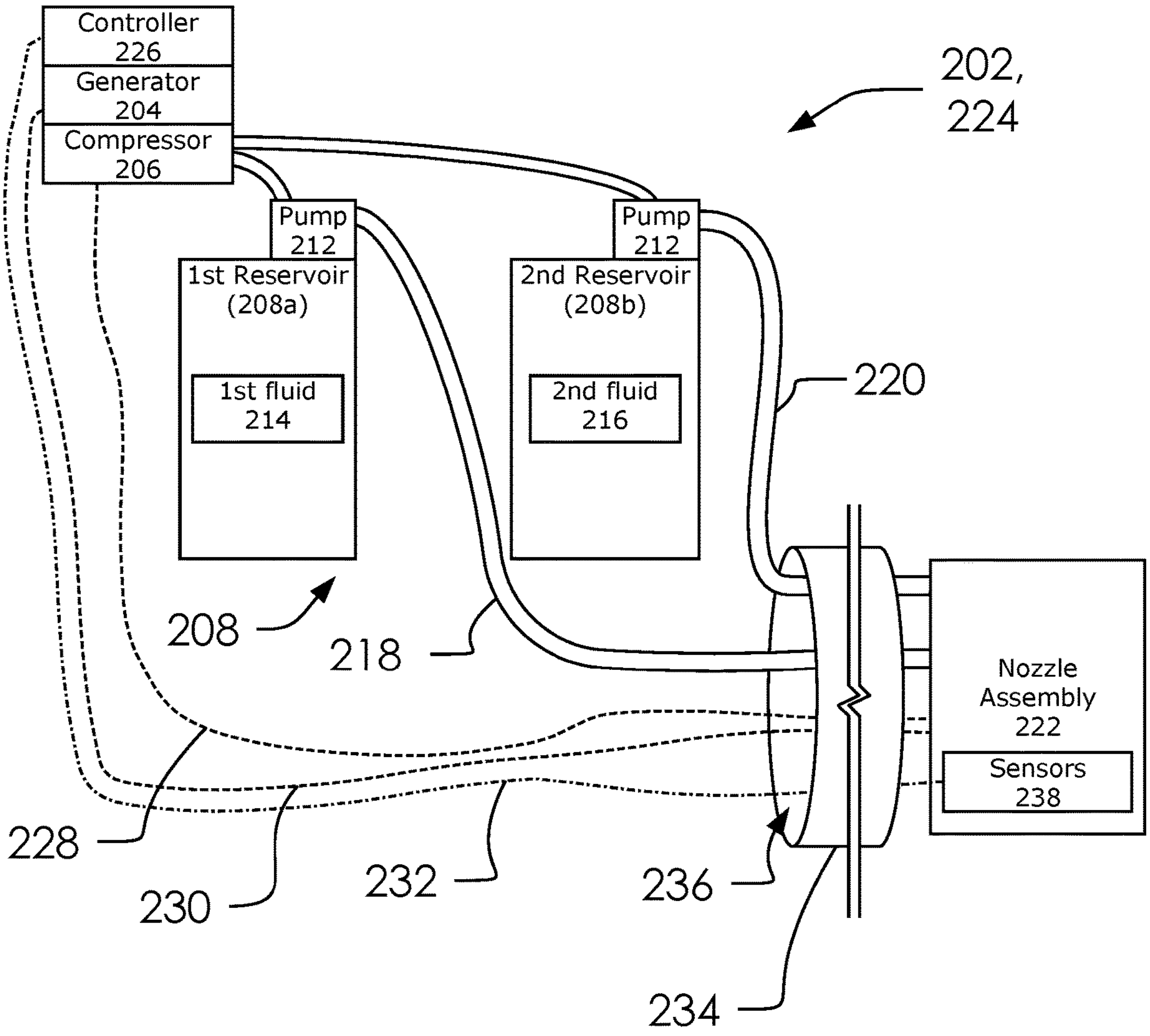
FIG. 2 illustrates a block diagram 224 of a foam spraying system 202.

FIG. 2 illustrates a block diagram 224 of a foam spraying system 202.

In one embodiment, said foam spraying system 202 can comprise a generator 204, a compressor 206, two fluid reservoirs 208 (which can comprise a first reservoir 208*a*, a second reservoir 208*b*), two transfer pumps 212, a controller 226, one or more airlines 228, one or more electrical lines 230, one or more controller lines 232, one or more line wraps 234 around a plurality of lines 236, first hose 218, second hose 220 and applicator nozzle assembly 222. Said applicator nozzle assembly 222 can comprise one or more sensors 238.

In one embodiment, said plurality of lines 236 can comprise said one or more airlines 228, said one or more electrical lines 230, said one or more controller lines 232, said first hose 218, and said second hose 220, a portion of which can be contained in said one or more line wraps 234. In one embodiment, said plurality of lines 236 can extend hundreds or even thousands of feet from said first reservoir 208*a* and said second reservoir 208*b* to said applicator nozzle assembly 222.

In one embodiment, said controller 226 can be attached to said one or more sensors 238 or sensors in said applicator nozzle assembly 222.

Said two transfer pumps 212 can be connected to said compressor 206.

Said first reservoir 208*a* can comprise a first fluid 214, and said second reservoir 208*b* can comprise a second fluid 216. In one embodiment, said two transfer pumps 212 can pump said first fluid 214 and said second fluid 216 from said first reservoir 208*a* and said second reservoir 208*b* through said first hose 218 and said second hose 220 to said applicator nozzle assembly 222. Said generator 204 can drive portions of said foam spraying system 202, as is known in the art.

In one embodiment, said one or more sensors 238 and said one or more controller lines 232 can regulate said foam spraying system 202 and said applicator nozzle assembly 222.

Figure 3:
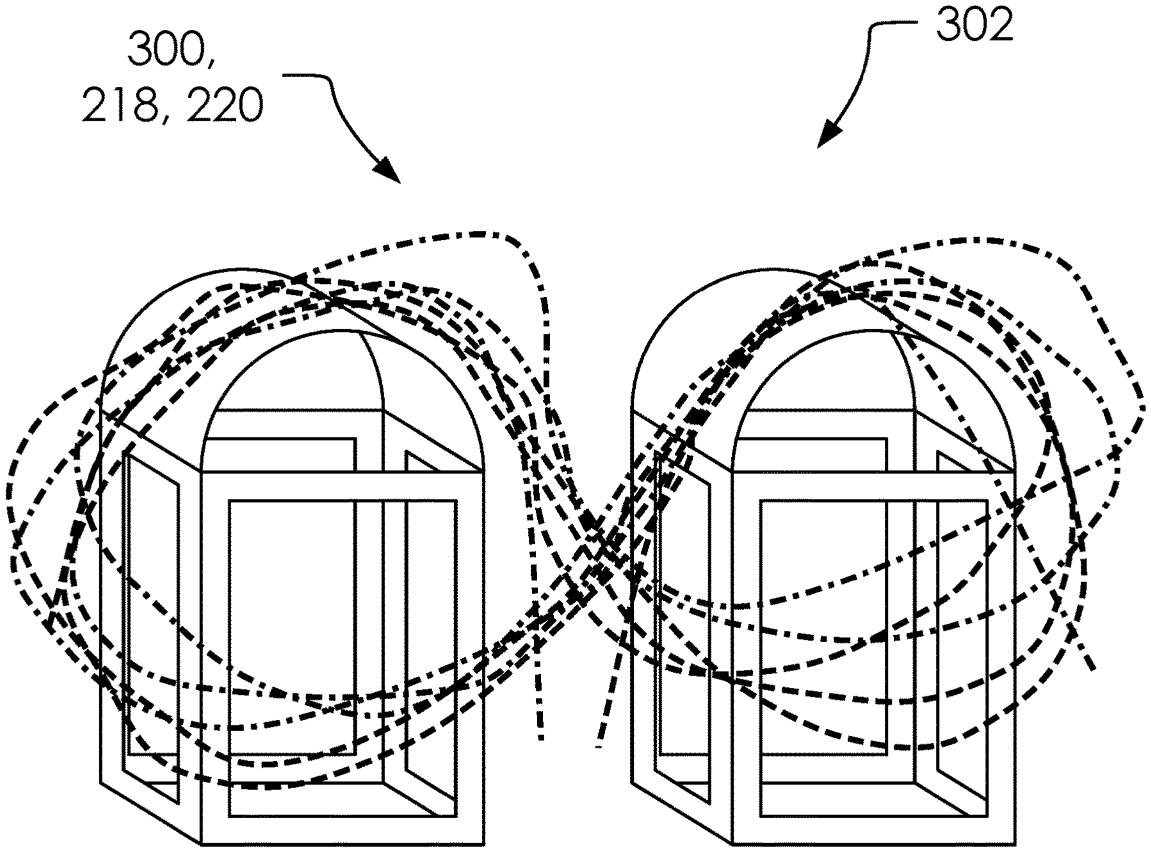
FIG. 3 illustrates an elevated front view of two hoses 300 on a prior art hose support system 302.

FIG. 3 illustrates an elevated front view of two hoses 300 on a prior art hose support system 302.

Herein, said reel system 100 can be a replacement and improvement upon said prior art hose support system 302. Both said reel system 100 and said prior art hose support system 302 can be used with said foam spraying system 202.

In one embodiment, said two hoses 300 (that is, said first hose 218 and said second hose 220) can be held by said prior art hose support system 302 by draping said two hoses 300 over a portion of said prior art hose support system 302. In some cases, said two hoses 300 can be two-hundred feet long. Accordingly, storing and maintaining said two hoses 300 can comprise a time consuming job.

Alternative configurations for handling longer hoses can comprise altering said reel system 100 with said center shaft assembly 108 being wider or said two spool side members 106 with a larger diameter.

Figure 4A:
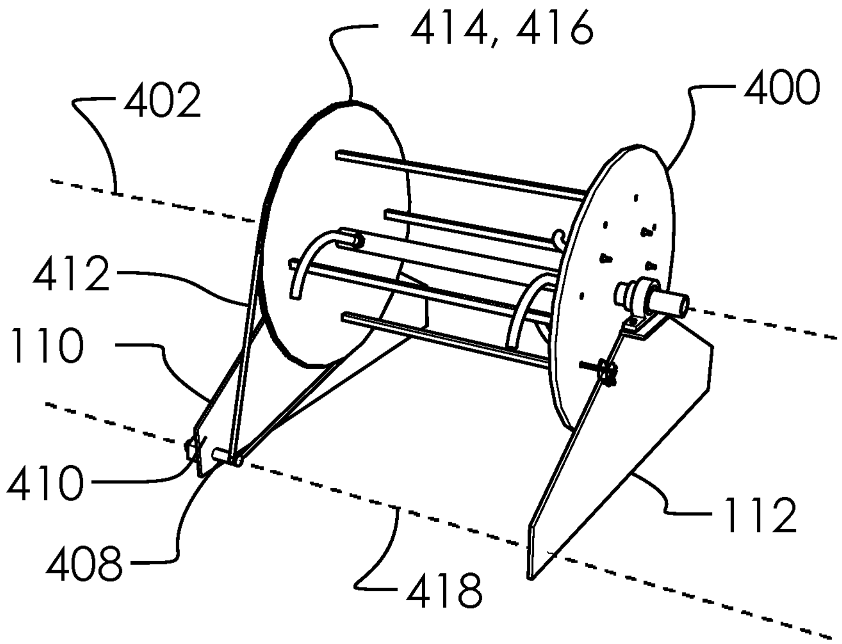
FIGS. 4A, and 4B illustrate perspective overviews of a spool portion 400, a first side support 110 and a second side support 112 of said reel system 100.
Figure 4B:
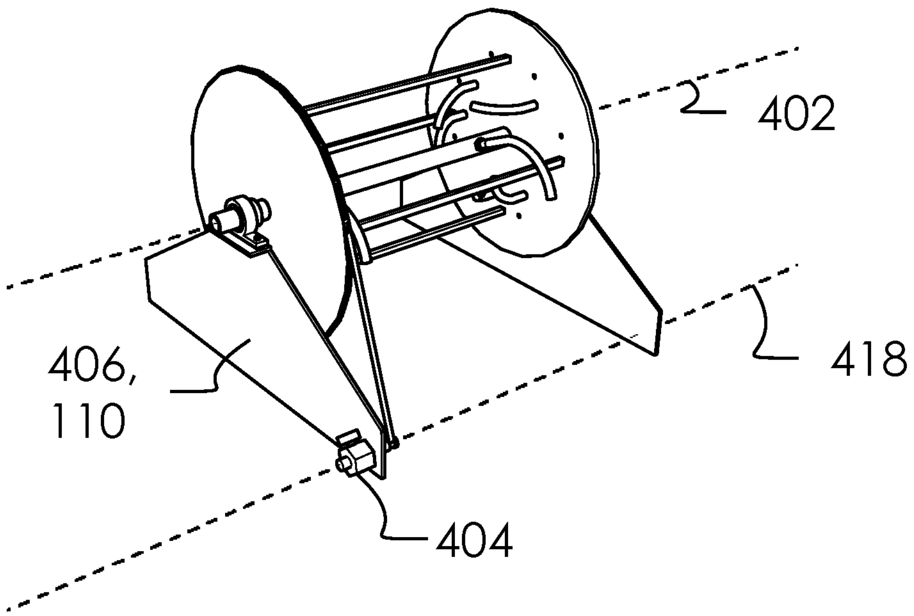
Figure 5A:
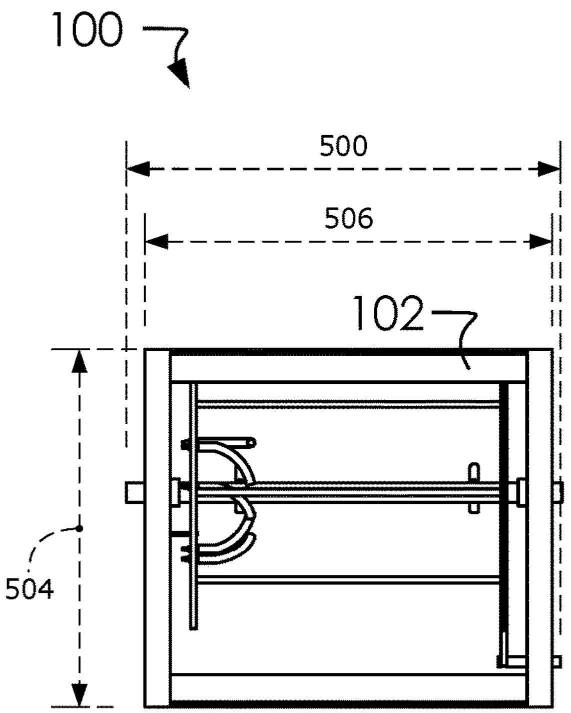
FIGS. 5A, 5B, 5C, and 5D illustrate an elevated front and side view of said reel system 100 with and without a spool support 102.
Figure 5B:
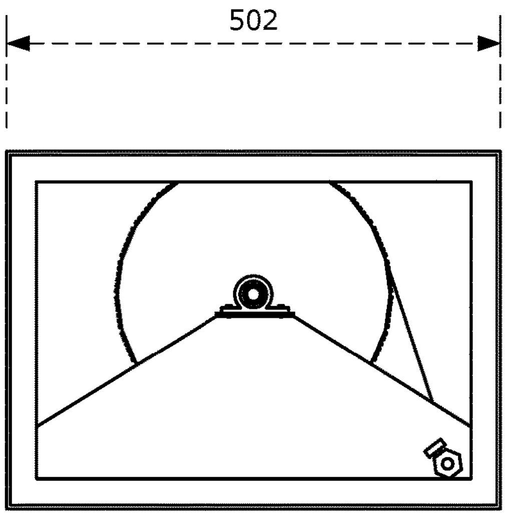
Figure 5C:
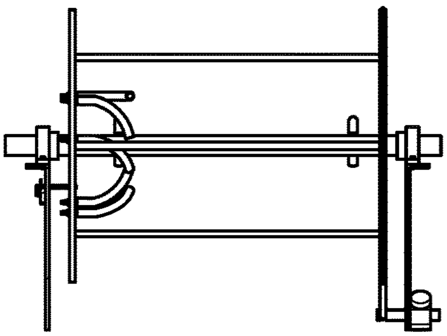
Figure 5D:
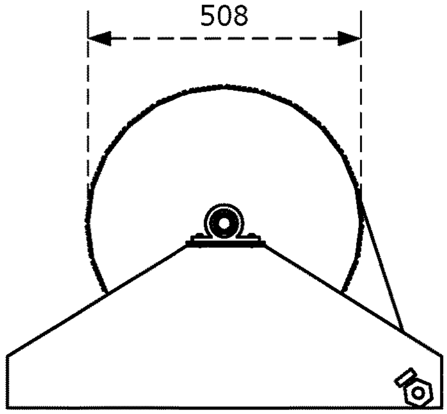

FIGS. 4A, and 4B illustrate perspective overviews of a spool portion 400, said first side support 110 and said second side support 112 of said reel system 100.

In one embodiment, said spool portion 400 can comprise said two spool side members 106, said center shaft assembly 108 and said one or more spool cross support bars 114. In one embodiment, said spool portion 400 can rotate around a spool axis 402.

In one embodiment, said belt drive assembly 104 can further comprise a drive system 404, a belt 412, and a plurality of teeth 414 on an outer edge 416 of said first side support 110.

Said drive system 404 can comprise a pneumatic pump driven drive system. However, other types of pumps and motors can be used to drive said spool portion 400, as would be known in the art.

Said drive system 404 can attach to said first side support 110. Said first side support 110 can comprise outside surface 406 and inside surface 410.

Said drive system 404 can comprise a drive shaft 408. In one embodiment, said drive shaft 408 can extend through said first side support 110 to said inside surface 410 of said first side support 110.

In one embodiment, said drive shaft 408 can transfer rotational power to said belt drive assembly 104 along a drive axis 418.

FIGS. 5A, 5B, 5C, and 5D illustrate an elevated front and side view of said reel system 100 with and without said spool support 102.

Said reel system 100 can comprise a system width 500, a system length 502, and a system height 504. Said spool support 102 can comprise a length equal to said system length 502, a frame width 506. Said two spool side members 106 can comprise a diameter 508.

Figure 6:
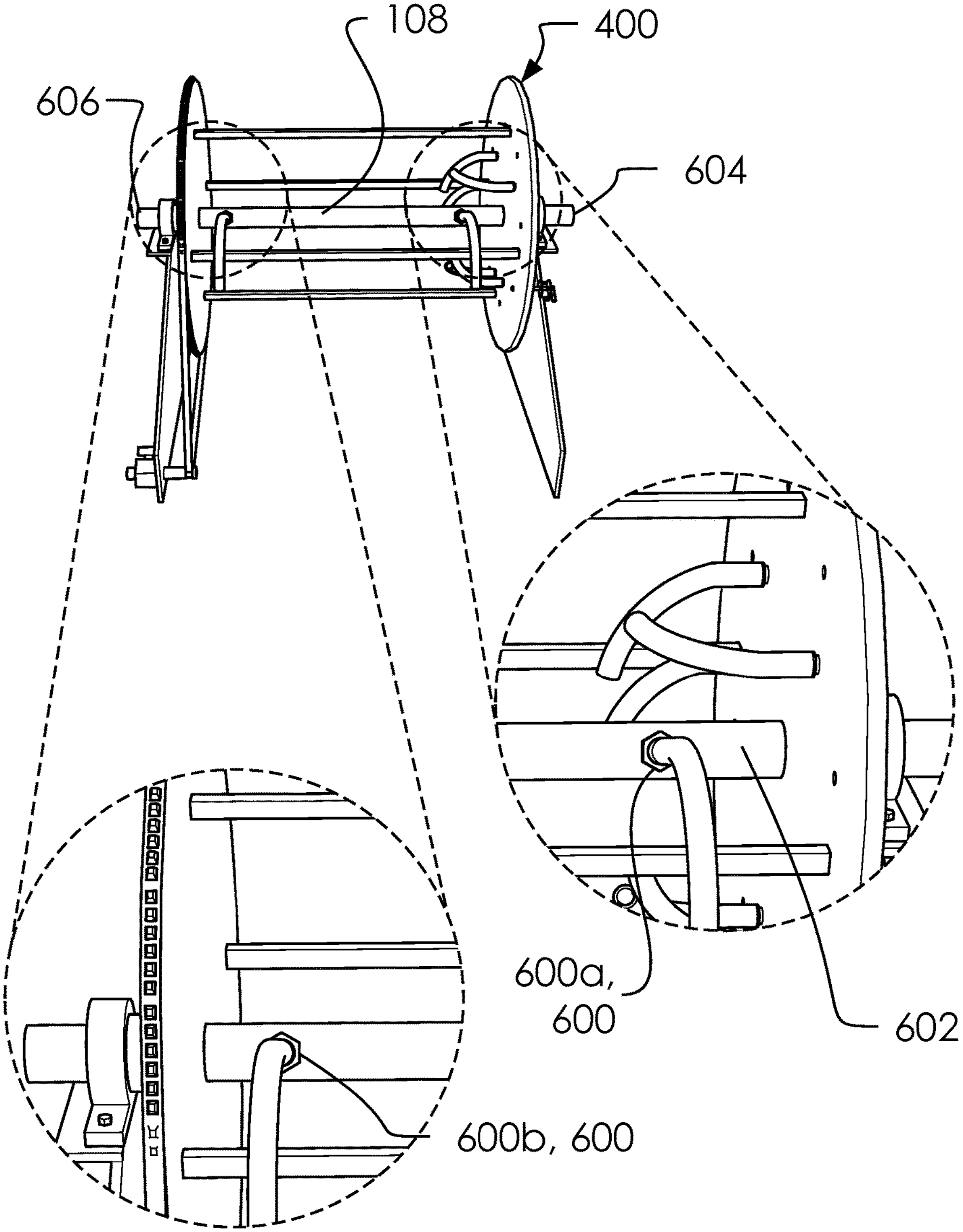
FIG. 6 illustrates a perspective overview of said spool portion 400 and two call out views of portions of a center shaft assembly 108.

FIG. 6 illustrates a perspective overview of said spool portion 400 and two call out views of portions of said center shaft assembly 108.

In one embodiment, said center shaft assembly 108 can comprise two or more fluid outputs 600 (which can comprise a first fluid output 600*a*, and a second fluid output 600*b*), and a shaft portion 602. Said shaft portion 602 can comprise a first end 604 and a second end 606.

Figure 7:
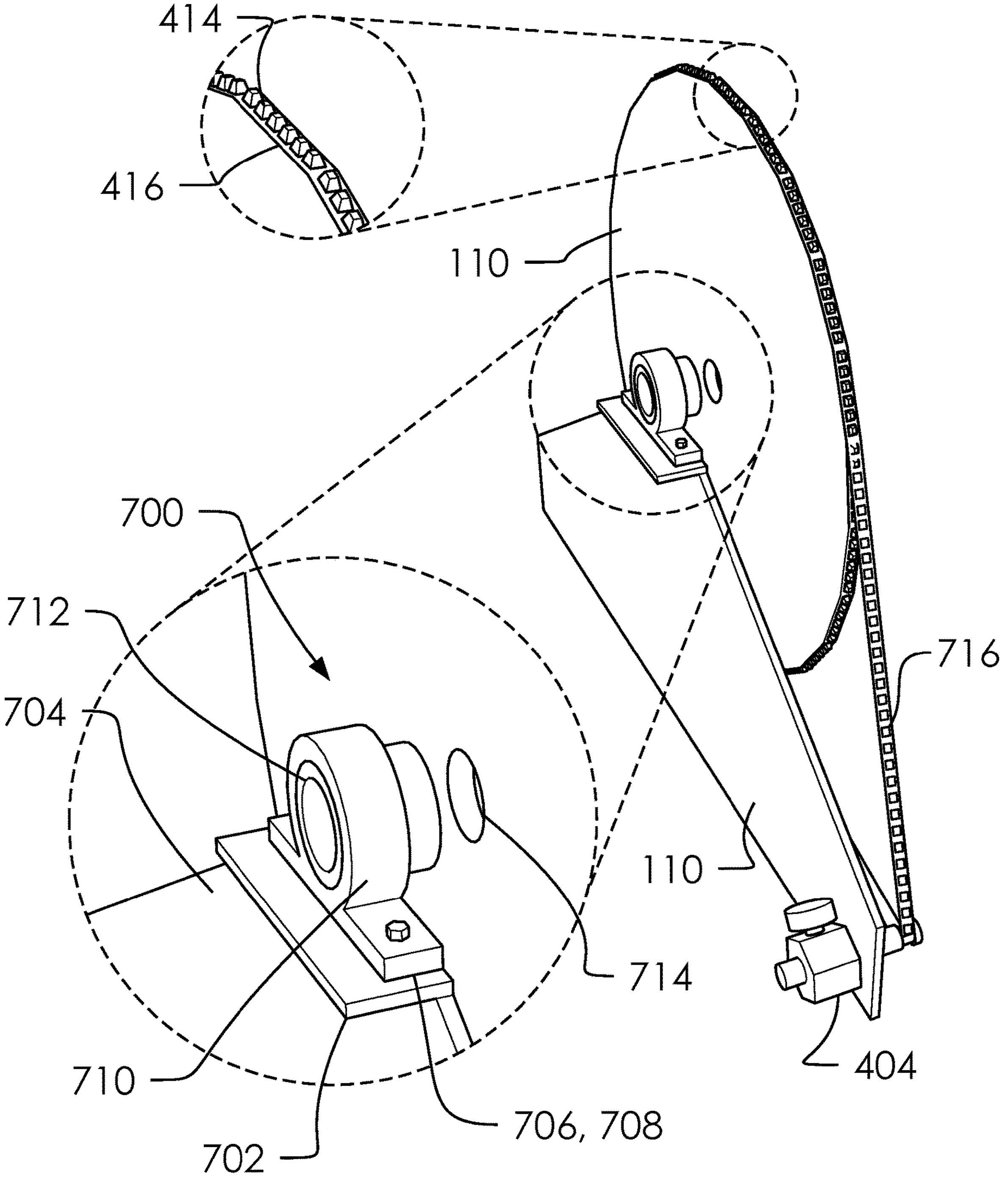
FIG. 7 illustrates a perspective overview of said first side support 110 with a detailed view of a plurality of teeth 414 and a detailed view of a bearing-coupling assembly 700.

FIG. 7 illustrates a perspective overview of said first side support 110 with a detailed view of said plurality of teeth 414 and a detailed view of a bearing-coupling assembly 700.

In one embodiment, said plurality of teeth 414 can be arranged around said outer edge 416.

In one embodiment, said first side support 110 can comprise a generally triangular shape having a support platform 702 at a top portion 704.

In one embodiment, said bearing-coupling assembly 700 can comprise a support bracket 706 having a lower bracket portion 708 and an upper ring portion 710. In one embodiment, said upper ring portion 710 can comprise a cylindrical shape.

In one embodiment, said spool portion 400 can comprise said bearing-coupling assembly 700 at each end of said center shaft assembly 108. Each among said bearing-coupling assembly 700 can comprise a bearing 712 and a fluid input coupler 718. In one embodiment, said center shaft assembly 108 can slide through and rotate within said bearing 712. Each among said bearing-coupling assembly 700 can comprise shaft aperture 714 to allow shaft-end fluid input 1100 to receive fluids into a portion of said center shaft assembly 108. Each said fluid input coupler 718 can attach to a fluid input and allow fluid to flow into said center shaft assembly 108 without rotating said fluid input coupler 718.

In one embodiment, said first side support 110 can comprise said shaft aperture 714.

In one embodiment, said plurality of teeth 414 can mate with a plurality of holes 716 in said belt 412, as illustrated and known in the art.

Figure 8:
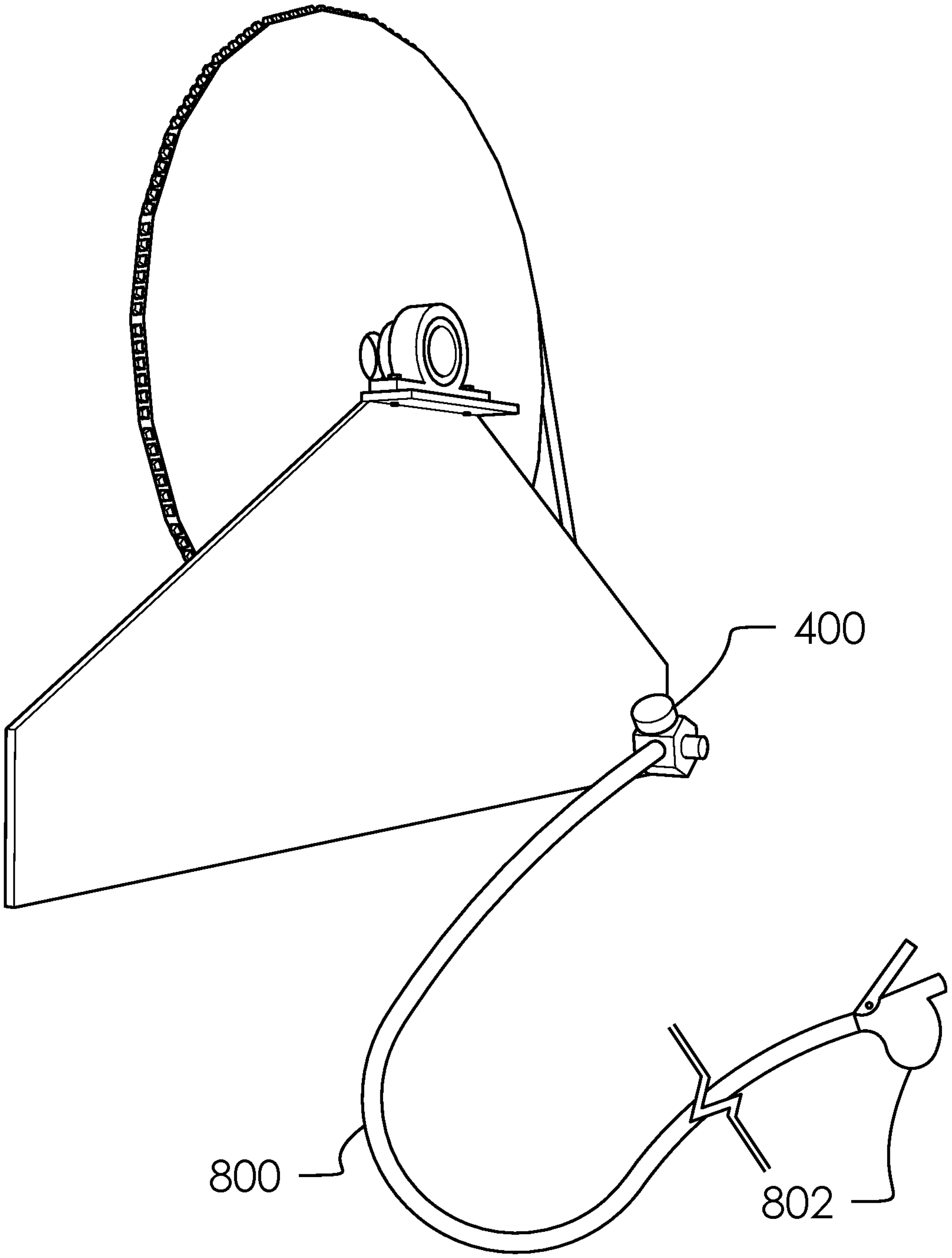
FIG. 8 illustrates a perspective overview of a drive system 404 with a compressed air hose 800 and a fail-safe trigger 802.

FIG. 8 illustrates a perspective overview of said drive system 404 with a compressed air hose 800 and a fail-safe trigger 802.

In one embodiment, said belt drive assembly 104 can further comprise said compressed air hose 800 and said fail-safe trigger 802. Said reel system 100 can be configured to activate said spool portion 400 by engaging said fail-safe trigger 802 to cause said drive system 404 to turn said drive shaft 408, and upon releasing said fail-safe trigger 802, said drive system 404 can stop running.

Figure 9A:
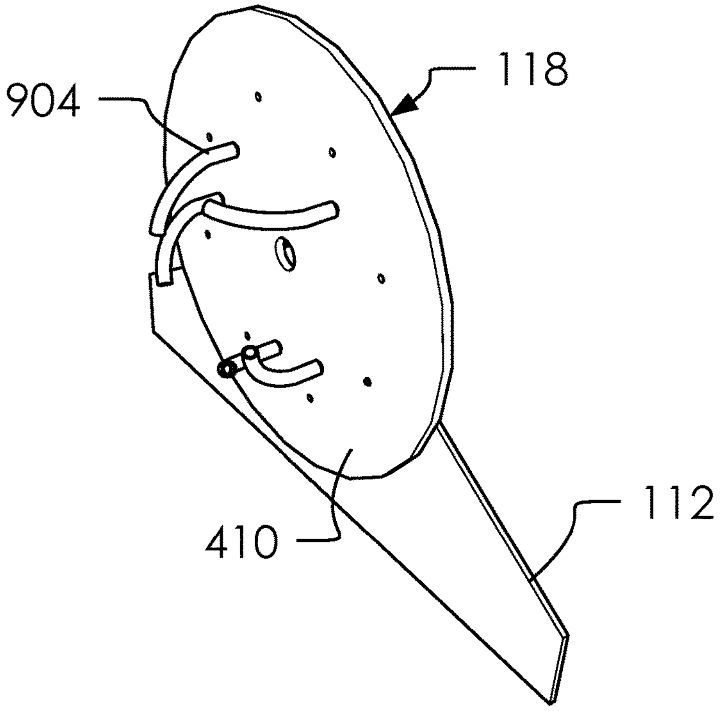
FIGS. 9A, and 9B illustrate a perspective overview of outside surface 406 and inside surface 410 of said second side support 112 and a second spool side member 118.
Figure 9B:
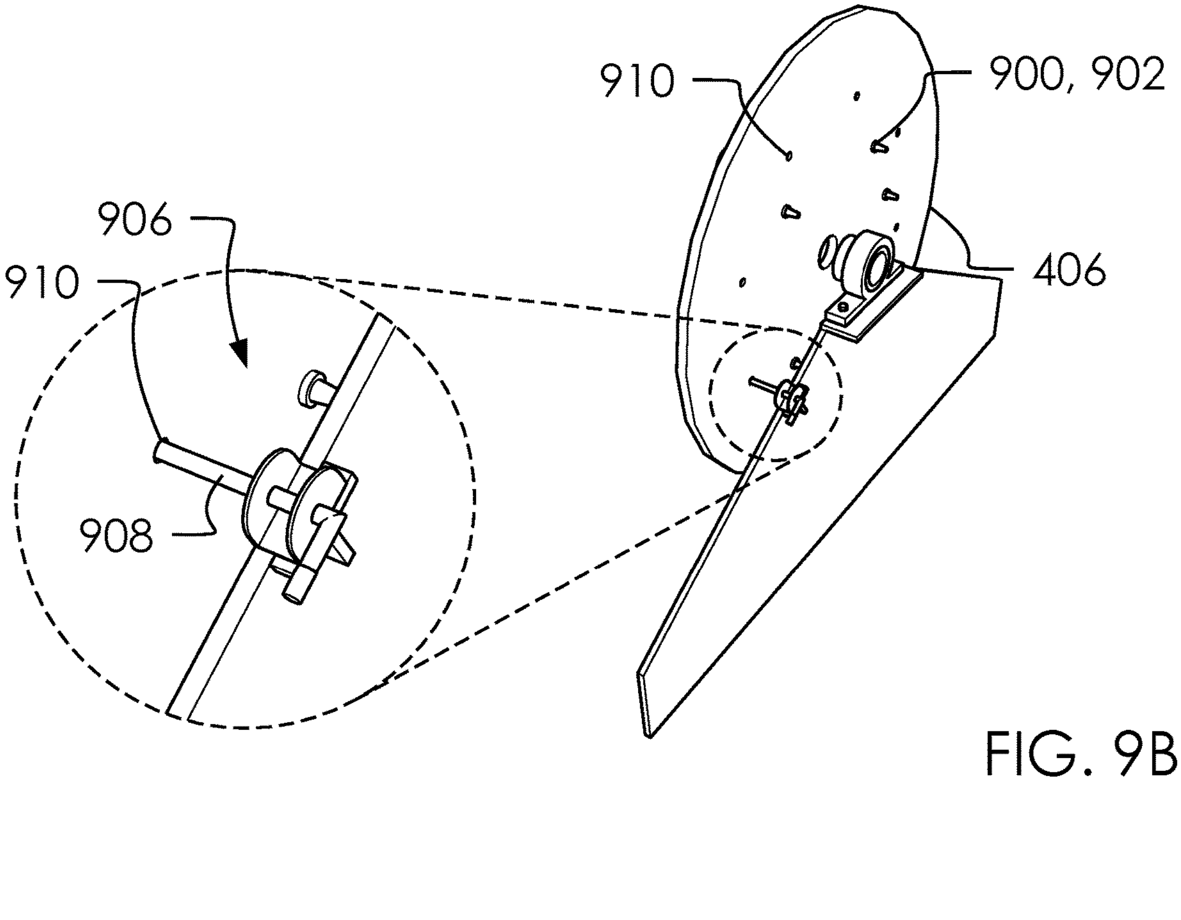

FIGS. 9A, and 9B illustrate a perspective overview of said outside surface 406 and said inside surface 410 of said second side support 112 and said second spool side member 118.

In one embodiment, said spool portion 400 can comprise one or more spool side-inputs 900. Each among said one or more spool side-inputs 900 can comprise an exterior input connector 902 attached to said outside surface 406 and an internal line connector 904 on said inside surface 410. Said one or more spool side-inputs 900 can be aligned off of said spool axis 402 and into a portion of said two spool side members 106, as illustrated.

In one embodiment, said one or more spool side-inputs 900 can comprise air lines, power lines, or data lines, as is known in the art. Said one or more spool side-inputs 900 can comprise quick connectors on either side of said second spool side member 118, as is known in the art.

In one embodiment, said reel system 100 can further comprise a locking assembly 906 configured to selectively hold said spool portion 400 in one rotary position and prevent spinning. One configuration of said locking assembly 906 comprises a locking pin 908 being adapted to selectively slide through one among one or more locking apertures 910 in either said second spool side member 118 or said first spool side member 116.

Figure 10:
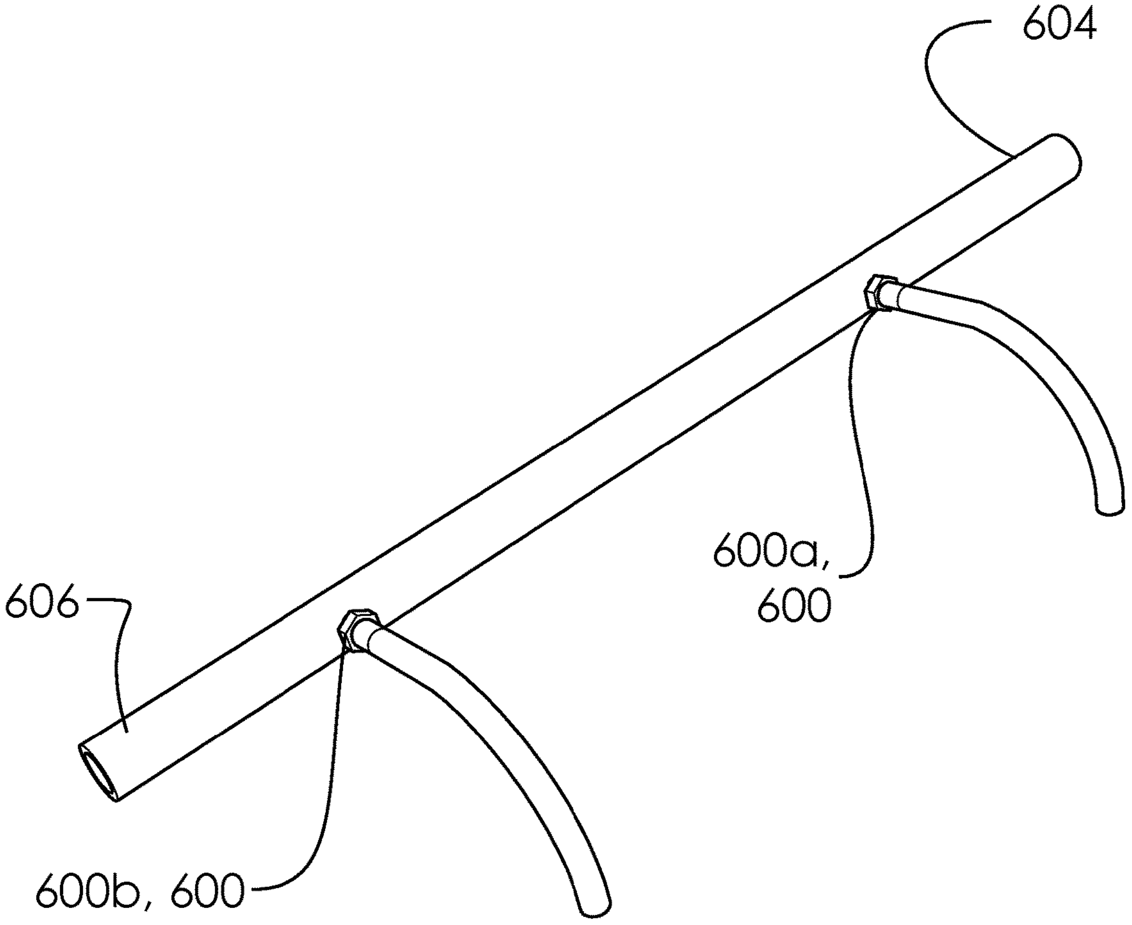
FIG. 10 illustrates a perspective overview of said center shaft assembly 108.

FIG. 10 illustrates a perspective overview of said center shaft assembly 108.

As discussed, said center shaft assembly 108 can comprise said two or more fluid outputs 600, said first fluid output 600*a*, said second fluid output 600*b*, said shaft portion 602, said first end 604 and said second end 606.

Figure 11:
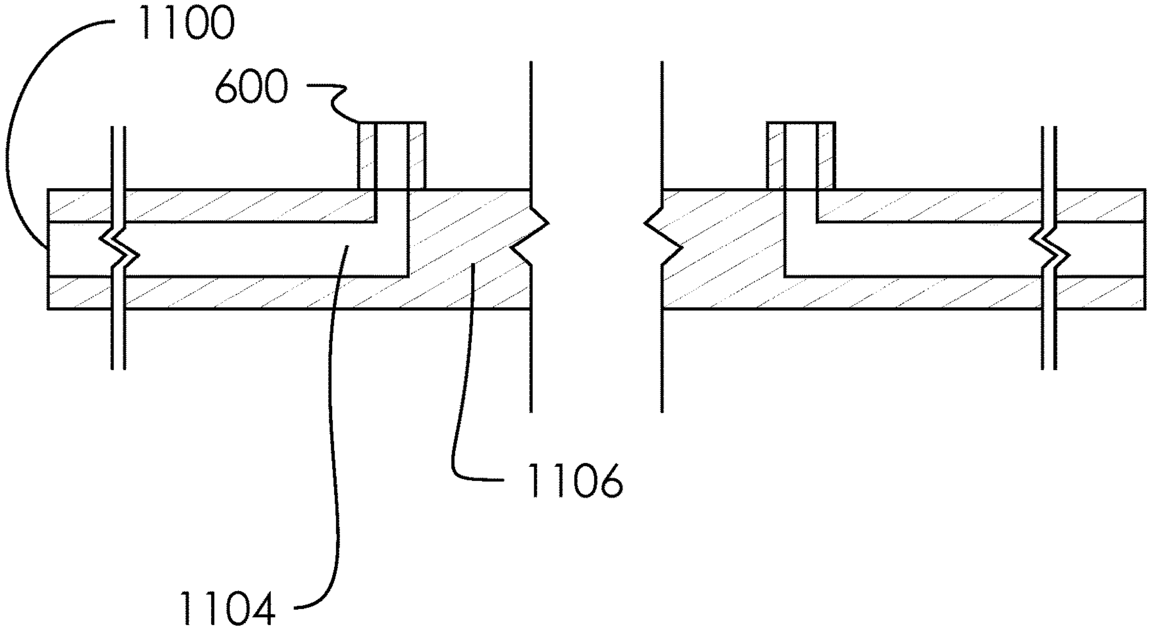
FIG. 11 illustrates an elevated cross-section view of each end of said center shaft assembly 108.

FIG. 11 illustrates an elevated cross-section view of each end of said center shaft assembly 108.

Each end of said center shaft assembly 108 can comprise said shaft-end fluid input 1100 aligned substantially with said spool axis 402. In one embodiment, said first fluid 214 and said second fluid 216 can be directed into said shaft-end fluid input 1100 at either and/or both ends of said center shaft assembly 108, flow through a fluid channel 1104, and out into the respective hose among said two or more fluid outputs 600. One or more fluids 1102 can comprise said first fluid 214 and said second fluid 216, as seen in said prior art hose support system 302, above.

Said shaft-end fluid input 1100 can comprise a first shaft-end fluid input 1100*a* and a second shaft-end fluid input 1100*b* located in said first end 604 and said second end 606 of said center shaft assembly 108, respectively. In one embodiment, said first shaft-end fluid input 1100*a* can receive said first fluid 214 and said second shaft-end fluid input 1100*b* can receive said second fluid 216. Wherein, said reel system 100 can be configured to receive said one or more fluids 1102 at opposite ends of said center shaft assembly 108 and deliver them to a portion of said center shaft assembly 108 within said two spool side members 106 to allow a first end of said two hoses 300 to connect to and rotate with said center shaft assembly 108.

In one embodiment, said center shaft assembly 108 can comprise a solid cylinder 1106 between said shaft-end fluid input 1100 at said first end 604 and said second end 606.

Figure 12:
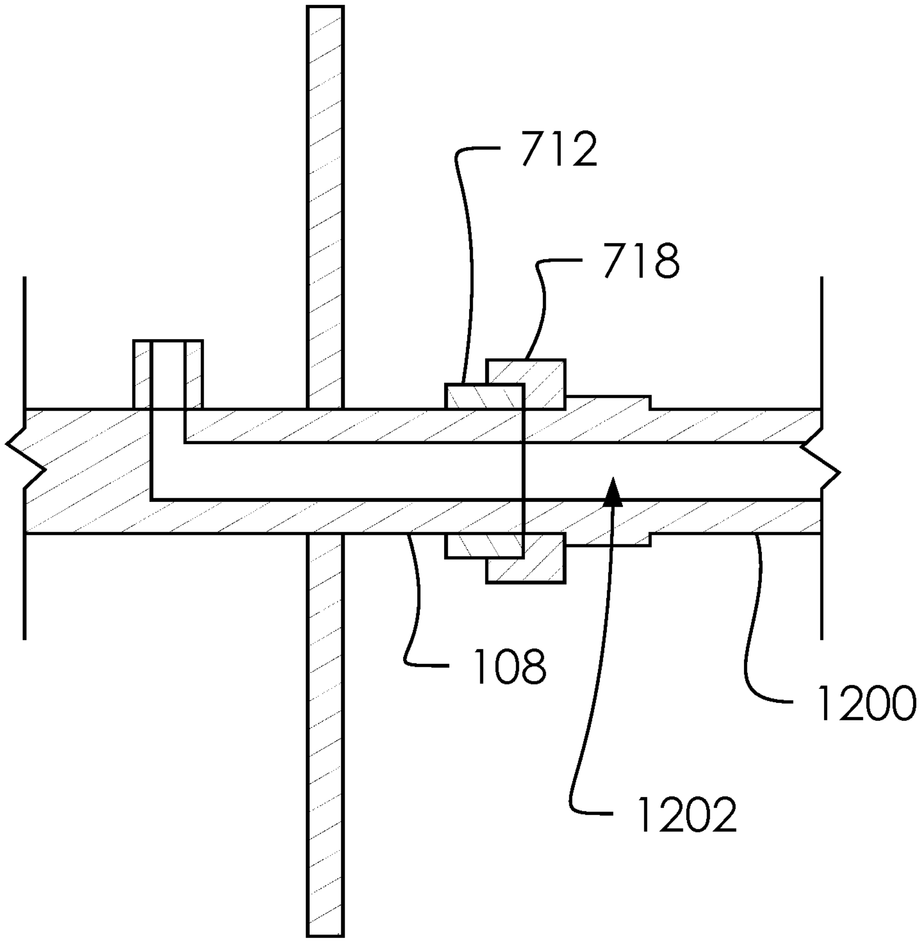
FIG. 12 illustrates an elevated side cross section view of said center shaft assembly 108 attached to a fluid reservoir line 1200.

FIG. 12 illustrates an elevated side cross section view of said center shaft assembly 108 attached to a fluid reservoir line 1200.

In one embodiment, each end of said center shaft assembly 108 can attach to said fluid reservoir line 1200 connected to one among said two fluid reservoirs 208.

In one embodiment, said fluid input coupler 718 can be configured for selectively attaching to said fluid reservoir line 1200, allowing said bearing 712 and said center shaft assembly 108 to rotate relative to said fluid input coupler 718, and containing a fluid input channel 1202 between said fluid reservoir line 1200 and said center shaft assembly 108.

Figure 13:
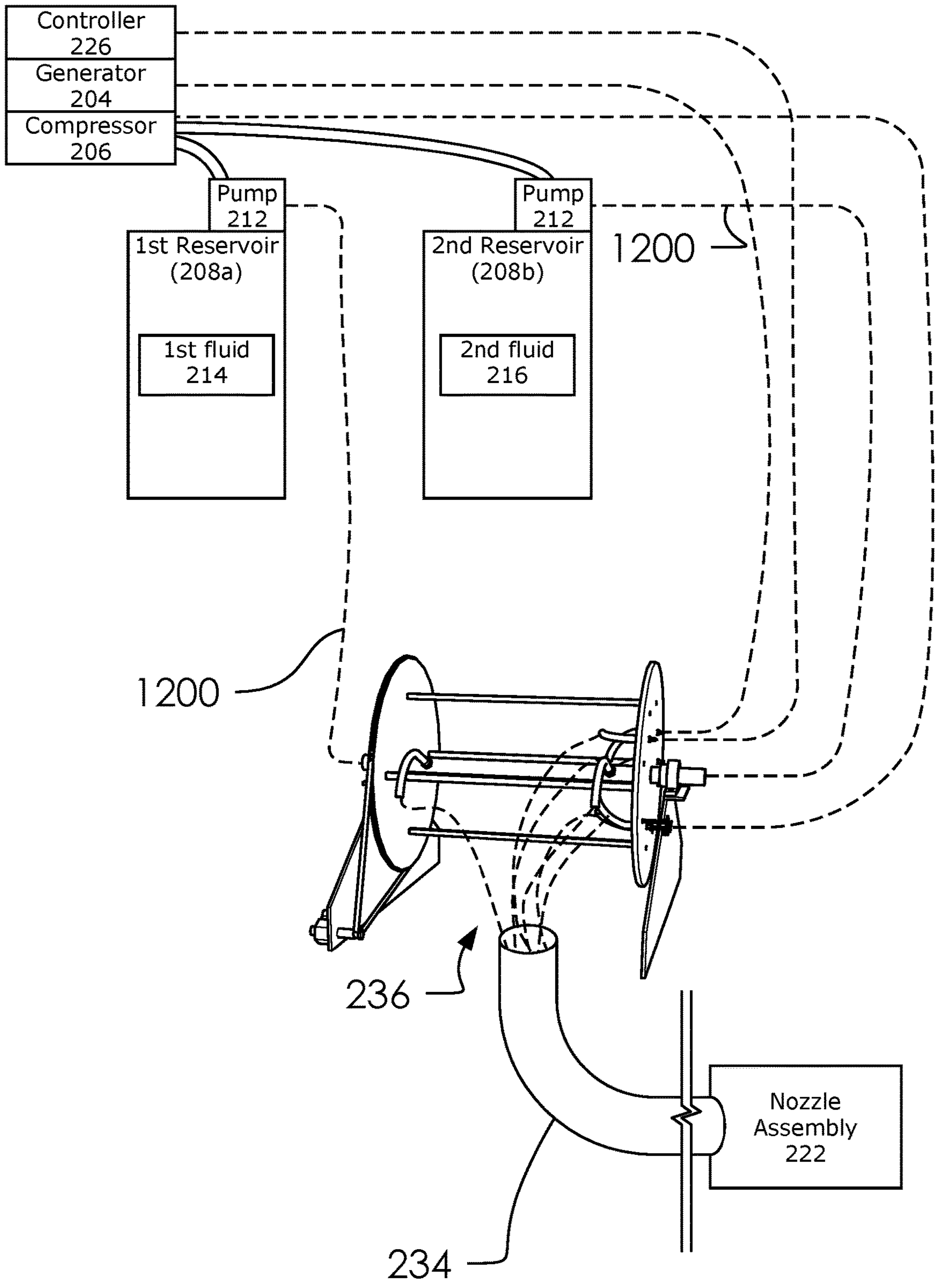
FIG. 13 illustrates a block diagram of said foam spraying system 202 with said reel system 100.

FIG. 13 illustrates a block diagram of said foam spraying system 202 with said reel system 100.

In one embodiment, said reel system 100 can be configured to setup said foam spraying system 202 by: unwinding said one or more line wraps 234 from said spool portion 400; receiving and selectively attaching to lines from said controller 226, said generator 204, said compressor 206; and retaining an attachment between said fluid reservoir line 1200 from said two fluid reservoirs 208 and said center shaft assembly 108.

One advantage of remaining attached to said fluid reservoir line 1200 between uses of said foam spraying system 202 can ensure that said first fluid 214 and said second fluid 216 do not get exposed to air in the atmosphere, which would damage the fluids. Thus, it would not be possible to detach the hoses from the reservoirs between uses. Accordingly said two hoses 300 must remain attached to said spool portion 400 at all times.

In one embodiment, said reel system 100 can be configured to disengage and store said foam spraying system 202 after use at a worksite by: detaching lines connected to said controller 226, said generator 204 and said compressor 206 from said one or more spool side-inputs 900; winding said plurality of lines 236 around said spool portion 400; and retaining an attachment between said fluid reservoir line 1200 from said two fluid reservoirs 208 and said center shaft assembly 108. In one embodiment, can be further configured to disengage by: activating said belt drive assembly 104 to wind up said plurality of lines 236.

The following sentences summarize the claims in view of the specification can may be considered a preferred embodiment of said reel system 100.

Said reel system 100 for speeding up setup and teardown of said foam spraying system 202 while increasing safety and protecting equipment. Said reel system 100 comprises said spool support 102, and said spool portion 400. Said spool portion 400 comprises said center shaft assembly 108, said two spool side members 106 having said first spool side member 116 and said second spool side member 118. Said spool portion 400 can be configured to rotate around said spool axis 402, wherein said spool portion 400 rotates about said spool axis 402. Said center shaft assembly 108 comprises said first end 604 and said second end 606, each rotatably supported by said bearing-coupling assembly 700. each end of said center shaft assembly 108 comprises said shaft-end fluid input 1100. Said first end 604 of said center shaft assembly 108 comprises said first shaft-end fluid input 1100*a* and said second end 606 of said center shaft assembly 108 comprises said second shaft-end fluid input 1100*b*. Said first shaft-end fluid input 1100*a* can be configured to receive said first fluid 214 and said second shaft-end fluid input 1100*b* can be configured to receive said second fluid 216. Said center shaft assembly 108 comprises said shaft portion 602 being between said two spool side members 106. Said center shaft assembly 108 comprises said two or more fluid outputs 600 in said shaft portion 602. Said two or more fluid outputs 600 comprise said first fluid output 600*a*, and said second fluid output 600*b*. Said reel system 100 can be configured to receive said first fluid 214 and said second fluid 216 at opposite ends of said center shaft assembly 108 in said first shaft-end fluid input 1100*a* and said second shaft-end fluid input 1100*b* and deliver them to said first fluid output 600*a* and said second fluid output 600*b*, respectively. Said two or more fluid outputs 600 can be located in said shaft portion 602 to allow a first end of said two hoses 300 to connect to and rotate with said center shaft assembly 108. each among said bearing-coupling assembly 700 comprises said bearing 712, and said fluid input coupler 718. Said center shaft assembly 108 can be configured to slide through and rotate within said bearing 712. each among said bearing-coupling assembly 700 comprises said fluid input coupler 718 to allow said shaft-end fluid input 1100 to connect to said fluid reservoir line 1200 and receive fluids into a portion of said center shaft assembly 108. Said fluid input coupler 718 can be configured for selectively attaching to said fluid reservoir line 1200, allowing said bearing 712 and said center shaft assembly 108 to rotate relative to said fluid input coupler 718, and containing said fluid input channel 1202 between said fluid reservoir line 1200 and said center shaft assembly 108. each among said fluid reservoir line 1200 can be configured to create a fluid connection between one among said two fluid reservoirs 208 and said shaft-end fluid input 1100. Said reel system 100 can be configured to setup said foam spraying system 202 by: unwinding said one or more line wraps 234 from said spool portion 400, and retaining an attachment between said fluid reservoir line 1200 from said two fluid reservoirs 208 and said center shaft assembly 108. Said reel system 100 can be configured to disengage and store said foam spraying system 202 after use at a worksite by: winding said plurality of lines 236 around said spool portion 400, and retaining an attachment between said fluid reservoir line 1200 from said two fluid reservoirs 208 and said center shaft assembly 108.

Said reel system 100 for speeding up setup and teardown of said foam spraying system 202 while increasing safety and protecting equipment. Said reel system 100 comprises said spool support 102, and said spool portion 400. Said spool portion 400 comprises said center shaft assembly 108, said two spool side members 106 having said first spool side member 116 and said second spool side member 118. Said spool portion 400 can be configured to rotate around said spool axis 402, wherein said spool portion 400 rotates about said spool axis 402. Said center shaft assembly 108 comprises said first end 604 and said second end 606, each rotatably supported by said bearing-coupling assembly 700. each end of said center shaft assembly 108 comprises said shaft-end fluid input 1100. Said first end 604 of said center shaft assembly 108 comprises said first shaft-end fluid input 1100*a* and said second end 606 of said center shaft assembly 108 comprises said second shaft-end fluid input 1100*b*. Said first shaft-end fluid input 1100*a* can be configured to receive said first fluid 214 and said second shaft-end fluid input 1100*b* can be configured to receive said second fluid 216. Said center shaft assembly 108 comprises said shaft portion 602 being between said two spool side members 106. Said center shaft assembly 108 comprises said two or more fluid outputs 600 in said shaft portion 602. Said two or more fluid outputs 600 comprise said first fluid output 600*a*, and said second fluid output 600*b*. Said reel system 100 can be configured to receive said first fluid 214 and said second fluid 216 at opposite ends of said center shaft assembly 108 in said first shaft-end fluid input 1100*a* and said second shaft-end fluid input 1100*b* and deliver them to said first fluid output 600*a* and said second fluid output 600*b*, respectively. Said two or more fluid outputs 600 can be located in said shaft portion 602 to allow a first end of said two hoses 300 to connect to and rotate with said center shaft assembly 108. each among said bearing-coupling assembly 700 comprises said bearing 712, and said fluid input coupler 718. Said center shaft assembly 108 can be configured to slide through and rotate within said bearing 712. each among said bearing-coupling assembly 700 comprises said fluid input coupler 718 to allow said shaft-end fluid input 1100 to connect to said fluid reservoir line 1200 and receive fluids into a portion of said center shaft assembly 108. Said fluid input coupler 718 can be configured for selectively attaching to said fluid reservoir line 1200, allowing said bearing 712 and said center shaft assembly 108 to rotate relative to said fluid input coupler 718, and containing said fluid input channel 1202 between said fluid reservoir line 1200 and said center shaft assembly 108. each among said fluid reservoir line 1200 can be configured to create a fluid connection between one among said two fluid reservoirs 208 and said shaft-end fluid input 1100. A portion of said two spool side members 106 comprise said one or more spool side-inputs 900. each among said one or more spool side-inputs 900 comprises said exterior input connector 902 attached to said outside surface 406 and said internal line connector 904 on said inside surface 410. Said one or more spool side-inputs 900 can be configured to selectively connect to one or more lines associated with said foam spraying system 202. Said reel system 100 can be configured to setup said foam spraying system 202 by: unwinding said one or more line wraps 234 from said spool portion 400, receiving and selectively attaching to lines from said controller 226, said generator 204, said compressor 206 to said one or more spool side-inputs 900, and retaining an attachment between said fluid reservoir line 1200 from said two fluid reservoirs 208 and said center shaft assembly 108. Said reel system 100 can be configured to disengage and store said foam spraying system 202 after use at a worksite by: detaching lines connected to said controller 226, said generator 204 and said compressor 206 from said one or more spool side-inputs 900, winding said plurality of lines 236 around said spool portion 400, and retaining an attachment between said fluid reservoir line 1200 from said two fluid reservoirs 208 and said center shaft assembly 108.

Said reel system 100 further comprises said locking assembly 906 configured to selectively hold said spool portion 400 in one rotary position and prevent spinning.

Said locking assembly 906 comprises said locking pin 908 being adapted to selectively slide through one among said one or more locking apertures 910 in either said second spool side member 118 or said first spool side member 116.

Said drive system 404 comprises a pneumatic pump driven drive system. Said reel system 100 further comprises said belt drive assembly 104. Said belt drive assembly 104 comprises said drive system 404, and said belt 412. Said spool portion 400 can be configured to mount between said first side support 110, said second side support 112. Said belt drive assembly 104 further comprises said plurality of teeth 414 on said outer edge 416 of said first side support 110. Said belt 412 can be configured to interface with said plurality of teeth 414 and transmit force from said drive system 404 to said spool portion 400. Said drive system 404 can be configured to attach to said first side support 110. Said drive system 404 can be configured to attach to said outside surface 406 of said first side support 110.

Said drive system 404 comprises said drive shaft 408. Said drive shaft 408 can be configured to extend through said first side support 110 to said inside surface 410 of said first side support 110. Said drive shaft 408 can be configured to transfer rotational power to said belt drive assembly 104 along said drive axis 418.

Said spool support 102 comprises said first side support 110, said second side support 112. Said spool support 102 connects to said bearing-coupling assembly 700 on each end of said center shaft assembly 108.

Said drive system 404 comprises a pneumatic pump driven drive system.

Said reel system 100 further comprises said belt drive assembly 104. Said belt drive assembly 104 comprises said drive system 404, and said belt 412. Said spool portion 400 can be configured to mount between said first side support 110, said second side support 112. Said belt drive assembly 104 further comprises said plurality of teeth 414 on said outer edge 416 of said first side support 110. Said belt 412 can be configured to interface with said plurality of teeth 414 and transmit force from said drive system 404 to said spool portion 400. Said drive system 404 can be configured to attach to said first side support 110. Said drive system 404 can be configured to attach to said outside surface 406 of said first side support 110.

Said plurality of teeth 414 can be configured to mate with said plurality of holes 716 in said belt 412.

Said drive system 404 comprises said drive shaft 408. Said drive shaft 408 can be configured to extend through said first side support 110 to said inside surface 410 of said first side support 110. Said drive shaft 408 can be configured to transfer rotational power to said belt drive assembly 104 along said drive axis 418.

Said drive system 404 comprises a pneumatic pump driven drive system. Said belt drive assembly 104 can be configured to further comprise said compressed air hose 800 and said fail-safe trigger 802. Said reel system 100 can be configured to activate said spool portion 400 by engaging said fail-safe trigger 802 to cause said drive system 404 to turn said drive shaft 408, and upon releasing said fail-safe trigger 802, said drive system 404 can be configured to stop running.

a portion of said two spool side members 106 comprise said one or more spool side-inputs 900. each among said one or more spool side-inputs 900 comprises said exterior input connector 902 attached to said outside surface 406 and said internal line connector 904 on said inside surface 410. Said one or more spool side-inputs 900 can be configured to selectively connect to one or more lines associated with said foam spraying system 202. Said reel system 100 can be configured to setup said foam spraying system 202 by: unwinding said one or more line wraps 234 from said spool portion 400, receiving and selectively attaching to lines from said controller 226, said generator 204, said compressor 206 to said one or more spool side-inputs 900, and retaining an attachment between said fluid reservoir line 1200 from said two fluid reservoirs 208 and said center shaft assembly 108. Said reel system 100 can be configured to disengage and store said foam spraying system 202 after use at a worksite by: detaching lines connected to said controller 226, said generator 204 and said compressor 206 from said one or more spool side-inputs 900, winding said plurality of lines 236 around said spool portion 400, and retaining an attachment between said fluid reservoir line 1200 from said two fluid reservoirs 208 and said center shaft assembly 108.

Said one or more spool side-inputs 900 can be aligned off of said spool axis 402 and into a portion of said two spool side members 106.

Each end of said center shaft assembly 108 comprises said shaft-end fluid input 1100 aligned substantially with said spool axis 402.

Said center shaft assembly 108 comprises said solid cylinder 1106 between said shaft-end fluid input 1100 at said first end 604 and said second end 606.

A method of speeding up setup and teardown of said foam spraying system 202 while increasing safety and protecting said reel system 100. Said reel system 100 can be configured to setup said foam spraying system 202 by: unwinding said one or more line wraps 234 from said spool portion 400, receiving and selectively attaching to lines from said controller 226, said generator 204, said compressor 206 to said one or more spool side-inputs 900, and retaining an attachment between said fluid reservoir line 1200 from said two fluid reservoirs 208 and said center shaft assembly 108. Said reel system 100 can be configured to disengage and store said foam spraying system 202 after use at a worksite by: detaching lines connected to said controller 226, said generator 204 and said compressor 206 from said one or more spool side-inputs 900, winding said plurality of lines 236 around said spool portion 400, and retaining an attachment between said fluid reservoir line 1200 from said two fluid reservoirs 208 and said center shaft assembly 108. wherein, said reel system 100 comprises said spool support 102, and said spool portion 400. Said spool portion 400 comprises said center shaft assembly 108, said two spool side members 106 having said first spool side member 116 and said second spool side member 118. Said spool portion 400 can be configured to rotate around said spool axis 402, wherein said spool portion 400 rotates about said spool axis 402. Said center shaft assembly 108 comprises said first end 604 and said second end 606, each rotatably supported by said bearing-coupling assembly 700. each end of said center shaft assembly 108 comprises said shaft-end fluid input 1100. Said first end 604 of said center shaft assembly 108 comprises said first shaft-end fluid input 1100*a* and said second end 606 of said center shaft assembly 108 comprises said second shaft-end fluid input 1100*b*. Said first shaft-end fluid input 1100*a* can be configured to receive said first fluid 214 and said second shaft-end fluid input 1100*b* can be configured to receive said second fluid 216. Said center shaft assembly 108 comprises said shaft portion 602 being between said two spool side members 106. Said center shaft assembly 108 comprises said two or more fluid outputs 600 in said shaft portion 602. Said two or more fluid outputs 600 comprise said first fluid output 600*a*, and said second fluid output 600*b*. Said reel system 100 can be configured to receive said first fluid 214 and said second fluid 216 at opposite ends of said center shaft assembly 108 in said first shaft-end fluid input 1100*a* and said second shaft-end fluid input 1100*b* and deliver them to said first fluid output 600*a* and said second fluid output 600*b*, respectively. Said two or more fluid outputs 600 can be located in said shaft portion 602 to allow a first end of said two hoses 300 to connect to and rotate with said center shaft assembly 108. each among said bearing-coupling assembly 700 comprises said bearing 712, and said fluid input coupler 718. Said center shaft assembly 108 can be configured to slide through and rotate within said bearing 712. each among said bearing-coupling assembly 700 comprises said fluid input coupler 718 to allow said shaft-end fluid input 1100 to connect to said fluid reservoir line 1200 and receive fluids into a portion of said center shaft assembly 108. Said fluid input coupler 718 can be configured for selectively attaching to said fluid reservoir line 1200, allowing said bearing 712 and said center shaft assembly 108 to rotate relative to said fluid input coupler 718, and containing said fluid input channel 1202 between said fluid reservoir line 1200 and said center shaft assembly 108. each among said fluid reservoir line 1200 can be configured to create a fluid connection between one among said two fluid reservoirs 208 and said shaft-end fluid input 1100.

Said reel system 100 can be further configured to disengage by: activating said belt drive assembly 104 to wind up said plurality of lines 236.

Said reel system 100 further comprises said locking assembly 906 configured to selectively hold said spool portion 400 in one rotary position and prevent spinning. Said locking assembly 906 comprises said locking pin 908 being adapted to selectively slide through one among said one or more locking apertures 910 in either said second spool side member 118 or said first spool side member 116.

The following listing of parts is included for the convenience of the reader:

said reel system 100,
said spool support 102,
said belt drive assembly 104,
said two spool side members 106,
said center shaft assembly 108,
said first side support 110,
said second side support 112,
said one or more spool cross support bars 114,
said first spool side member 116,
said second spool side member 118,
said foam spraying system 202,
said generator 204,
said compressor 206,
said two fluid reservoirs 208,
said first reservoir 208*a*,
said second reservoir 208*b*,
said two transfer pumps 212,
said first fluid 214,
said second fluid 216,
said first hose 218,
said second hose 220,
said applicator nozzle assembly 222,
said block diagram 224,
said controller 226,
said one or more airlines 228,
said one or more electrical lines 230,
said one or more controller lines 232,
said one or more line wraps 234,
said plurality of lines 236,
said one or more sensors 238,
said two hoses 300,
said prior art hose support system 302,
said spool portion 400,
said spool axis 402,
said drive system 404,
said outside surface 406,
said drive shaft 408,
said inside surface 410,
said belt 412,
said plurality of teeth 414,
said outer edge 416,
said drive axis 418,
said system width 500,
said system length 502,
said system height 504,
said frame width 506,
said diameter 508,
said two or more fluid outputs 600,
said first fluid output 600*a*,
said second fluid output 600*b*,
said shaft portion 602,
said first end 604,
said second end 606,
said bearing-coupling assembly 700,
said support platform 702,
said top portion 704,
said support bracket 706,
said lower bracket portion 708,
said upper ring portion 710,
said bearing 712,
said shaft aperture 714,
said plurality of holes 716,
said fluid input coupler 718,
said compressed air hose 800,
said fail-safe trigger 802,
said one or more spool side-inputs 900,
said exterior input connector 902,
said internal line connector 904,
said locking assembly 906,
said locking pin 908,
said one or more locking apertures 910,
said shaft-end fluid input 1100,
said first shaft-end fluid input 1100*a*,
said second shaft-end fluid input 1100*b*,
said one or more fluids 1102, said fluid channel 1104,
said solid cylinder 1106,
said fluid reservoir line 1200, and
said fluid input channel 1202.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A reel system for speeding up setup and teardown of a foam spraying system while increasing safety and protecting equipment, wherein:

said reel system comprises a spool support, and a spool portion;

said spool portion comprises a center shaft assembly, two spool side members having a first spool side member and a second spool side member;

said spool portion is configured to rotate around a spool axis;

said center shaft assembly comprises a first end and a second end, each rotatably supported by a bearing-coupling assembly;

each end of said center shaft assembly comprises a shaft-end fluid input;

said first end of said center shaft assembly comprises a first shaft-end fluid input and said second end of said center shaft assembly comprises a second shaft-end fluid input;

said first shaft-end fluid input is configured to receive a first fluid and said second shaft-end fluid input is configured to receive a second fluid;

said center shaft assembly comprises a shaft portion being between said two spool side members;

said center shaft assembly comprises two or more fluid outputs in said shaft portion;

said two or more fluid outputs comprise a first fluid output, and a second fluid output;

said reel system is configured to receive said first fluid and said second fluid at opposite ends of said center shaft assembly in said first shaft-end fluid input and said second shaft-end fluid input and deliver them to said first fluid output and said second fluid output, respectively;

said two or more fluid outputs are located in said shaft portion to allow a first end of two hoses to connect to and rotate with said center shaft assembly;

each among said bearing-coupling assembly comprises a bearing, and a fluid input coupler;

said center shaft assembly is configured to slide through and rotate within each bearing of each bearing-coupling assembly;

said fluid input coupler of each said bearing-coupling assembly is configured to allow said shaft-end fluid input to connect to a fluid reservoir line and receive fluids into a portion of said center shaft assembly;

said fluid input coupler of each said bearing-coupling assembly is configured for selectively attaching to said fluid reservoir line, allowing each bearing and said center shaft assembly to rotate relative to each said fluid input coupler, and containing a fluid input channel between said fluid reservoir line and said center shaft assembly;

each among said fluid reservoir line is configured to create a fluid connection between one among two fluid reservoirs and said shaft-end fluid input;

a portion of said two spool side members comprise one or more side auxiliary ports;

each among said one or more side auxiliary ports comprises an input coupling and an output coupling;

said one or more side auxiliary ports are configured to selectively connect to one or more lines associated with said foam spraying system;

said reel system is configured to selectively manage a plurality of lines associated with said foam spraying system;

said plurality of lines comprise a plurality of input lines and a plurality of output lines;

said plurality of input lines comprise a portion of said plurality of lines connected to said reel system outside of said two spool side members;

said plurality of output lines comprise a portion of said plurality of lines connected to said reel system inside of said two spool side members;

said reel system is configured to setup said foam spraying system by:

unwinding said plurality of output lines from said spool portion, receiving and selectively attaching said reel system to a portion of said plurality of output lines from a controller, a generator, a compressor to said one or more side auxiliary ports, and retaining a fluid connection between said two fluid reservoirs and said center shaft assembly;

said reel system is configured to disengage and store said foam spraying system after use at a worksite by:

detaching said plurality of output lines connected to said controller, said generator and said compressor from said one or more side auxiliary ports, winding said plurality of output lines around said spool portion, and retaining a fluid connection between said two fluid reservoirs and said center shaft assembly.

2. A reel system for speeding up setup and teardown of a foam spraying system while increasing safety and protecting equipment, wherein:

said reel system comprises a spool support, and a spool portion;

said spool portion comprises a center shaft assembly, two spool side members having a first spool side member and a second spool side member;

said spool portion is configured to rotate around a spool axis;

said center shaft assembly comprises a first end and a second end, each rotatably supported by a bearing-coupling assembly;

each end of said center shaft assembly comprises a shaft-end fluid input;

said first end of said center shaft assembly comprises a first shaft-end fluid input and said second end of said center shaft assembly comprises a second shaft-end fluid input;

said first shaft-end fluid input is configured to receive a first fluid and said second shaft-end fluid input is configured to receive a second fluid;

said center shaft assembly comprises a shaft portion being between said two spool side members;

said center shaft assembly comprises two or more fluid outputs in said shaft portion;

said two or more fluid outputs comprise a first fluid output, and a second fluid output;

said reel system is configured to receive said first fluid and said second fluid at opposite ends of said center shaft assembly in said first shaft-end fluid input and said second shaft-end fluid input and deliver them to said first fluid output and said second fluid output, respectively;

said two or more fluid outputs are located in said shaft portion to allow a first end of two hoses to connect to and rotate with said center shaft assembly;

each among said bearing-coupling assembly comprises a bearing, and a fluid input coupler;

said center shaft assembly is configured to slide through and rotate within each bearing of each bearing-coupling assembly;

said fluid input coupler of each said bearing-coupling assembly is configured to allow said shaft-end fluid input to connect to a fluid reservoir line and receive fluids into a portion of said center shaft assembly;

said fluid input coupler of each said bearing-coupling assembly is configured for selectively attaching to said fluid reservoir line, allowing each bearing and said center shaft assembly to rotate relative to each said fluid input coupler, and containing a fluid input channel between said fluid reservoir line and said center shaft assembly;

each among said fluid reservoir line is configured to create a fluid connection between one among two fluid reservoirs and said shaft-end fluid input;

a portion of said two spool side members comprise one or more spool side-inputs;

each among said one or more spool side-inputs comprises an exterior input connector attached to an outside surface of said two spool side members and an internal line connector on an inside surface of said two spool side members;

said reel system is configured to selectively manage a plurality of lines associated with said foam spraying system;

said plurality of lines comprise a plurality of input lines and a plurality of output lines;

said plurality of input lines comprise a portion of said plurality of lines connected to said reel system outside of said two spool side members;

said plurality of output lines comprise a portion of said plurality of lines connected to said reel system inside of said two spool side members;

said reel system is configured to setup said foam spraying system by:

unwinding a portion of said plurality of output lines from said spool portion, receiving and selectively attaching said reel system to a portion of said plurality of output lines from a controller, a generator, a compressor to said one or more spool side-inputs, and retaining a fluid connection between said two fluid reservoirs and said center shaft assembly;

said reel system is configured to disengage and store said foam spraying system after use at a worksite by:

detaching said plurality of output lines connected to said controller, said generator and said compressor from said one or more spool side-inputs, winding said plurality of output lines around said spool portion, and retaining a fluid connection between said two fluid reservoirs and said center shaft assembly.

3. The reel system of claim 2, wherein:

said reel system further comprises a locking assembly configured to selectively hold:

said spool portion in one rotary position and prevent spinning.

4. The reel system of claim 3, wherein:

said locking assembly comprises a locking pin being adapted to selectively slide through one among one or more locking apertures in either said second spool side member or said first spool side member.

5. The reel system of claim 2, wherein:

said reel system further comprises a belt drive assembly;

said belt drive assembly comprises a drive system;

said drive system comprises a pneumatic pump driven drive system;

said belt drive assembly comprises said drive system, and a belt;

said spool portion is configured to mount between a first side support, a second side support;

said belt drive assembly further comprises a plurality of teeth on an outer edge of said first side support;

said belt is configured to interface with said plurality of teeth and transmit force from said drive system to said spool portion;

said drive system is configured to attach to said first side support; and said drive system is configured to attach to an outside surface of said first side support.

6. The reel system of claim 5, wherein:

said drive system comprises a drive shaft;

said drive shaft is configured to extend through said first side support to an inside surface of said first side support; and said drive shaft is configured to transfer rotational power to said belt drive assembly along a drive axis.

7. The reel system of claim 2, wherein:

said spool support comprises said first side support, said second side support; and said spool support connects to said bearing-coupling assembly on each end of said center shaft assembly.

8. The reel system of claim 2, wherein:

said reel system further comprises a belt drive assembly;

said belt drive assembly comprises a drive system;

said drive system comprises a pneumatic pump driven drive system.

9. The reel system of claim 2, wherein:

said reel system further comprises a belt drive assembly;

said belt drive assembly comprises a drive system, and a belt;

said spool portion is configured to mount between a first side support, a second side support;

said belt drive assembly further comprises a plurality of teeth on an outer edge of said first side support;

said belt is configured to interface with said plurality of teeth and transmit force from said drive system to said spool portion;

said drive system is configured to attach to said first side support; and said drive system is configured to attach to an outside surface of said first side support.

10. The reel system of claim 9, wherein:

said plurality of teeth is configured to mate with a plurality of holes in said belt.

11. The reel system of claim 9, wherein:

said drive system comprises a drive shaft;

said drive shaft is configured to extend through said first side support to an inside surface of said first side support; and said drive shaft is configured to transfer rotational power to said belt drive assembly along a drive axis.

12. The reel system of claim 2, wherein:

said reel system further comprises a belt drive assembly;

said belt drive assembly comprises a drive system;

said drive system comprises a drive shaft;

said drive system comprises a pneumatic pump driven drive system;

said belt drive assembly is configured to further comprise a compressed air hose and a fail-safe trigger; and said reel system is configured to activate said spool portion by engaging said fail-safe trigger to cause said drive system to turn said drive shaft, and upon releasing said fail-safe trigger, said drive system is configured to stop running.

13. The reel system of claim 2, wherein:

a portion of said two spool side members comprise said one or more spool side-inputs;

each among said one or more spool side-inputs comprises said exterior input connector attached to an outside surface and said internal line connector on said inside surface;

said one or more spool side-inputs are configured to selectively connect to one or more lines associated with said foam spraying system;

said reel system is configured to setup said foam spraying system by:

unwinding said a plurality of lines from said spool portion, receiving and selectively attaching one or more controller lines, one or more electrical lines, and one or more airlines from said controller, said generator, said compressor to said one or more spool side-inputs, and retaining a fluid connection between said two fluid reservoirs and said center shaft assembly;

said reel system is configured to disengage and store said foam spraying system after use at a worksite by:

detaching one or more controller lines, one or more electrical lines, and one or more airlines connected to said controller, said generator and said compressor from said one or more spool side-inputs, winding said plurality of lines around said spool portion, and retaining a fluid connection between said two fluid reservoirs and said center shaft assembly.

14. The reel system of claim 2, wherein:

each end of said center shaft assembly comprises said shaft-end fluid input aligned substantially with said spool axis.

15. The reel system of claim 14, wherein:

said center shaft assembly comprises a solid cylinder between said shaft-end fluid input at said first end and said second end.

16. A method for speeding up setup and teardown of a foam spraying system while increasing safety and protecting a reel system, wherein:

said reel system is configured to setup said foam spraying system by:

unwinding a plurality of output lines from a spool portion, receiving and selectively attaching said reel system to a portion of said plurality of output lines from a controller, a generator, a compressor to one or more spool side-inputs, and retaining a fluid connection between two fluid reservoirs and a center shaft assembly;

said reel system is configured to disengage and store said foam spraying system after use at a worksite by:

detaching one or more controller lines, one or more electrical lines, and one or more airlines connected to said controller, said generator and said compressor from said one or more spool side-inputs, winding said plurality of output lines around said spool portion, and retaining an attachment between a fluid reservoir line from each among said two fluid reservoirs and said center shaft assembly;

wherein, said reel system comprises a spool support, and said spool portion;

said spool portion comprises said center shaft assembly, two spool side members having a first spool side member and a second spool side member;

said spool portion is configured to rotate around a spool axis;

said center shaft assembly comprises a first end and a second end, each rotatably supported by a bearing-coupling assembly;

each end of said center shaft assembly comprises a shaft-end fluid input;

said first end of said center shaft assembly comprises a first shaft-end fluid input and said second end of said center shaft assembly comprises a second shaft-end fluid input;

said first shaft-end fluid input is configured to receive a first fluid and said second shaft-end fluid input is configured to receive a second fluid;

said center shaft assembly comprises a shaft portion being between said two spool side members;

said center shaft assembly comprises two or more fluid outputs in said shaft portion;

said two or more fluid outputs comprise a first fluid output, and a second fluid output;

said reel system is configured to receive said first fluid and said second fluid at opposite ends of said center shaft assembly in said first shaft-end fluid input and said second shaft-end fluid input and deliver them to said first fluid output and said second fluid output, respectively;

said two or more fluid outputs are located in said shaft portion to allow a first end of two hoses to connect to and rotate with said center shaft assembly;

each among said bearing-coupling assembly comprises a bearing, and a fluid input coupler;

said center shaft assembly is configured to slide through and rotate within each bearing of each bearing-coupling assembly;

said fluid input coupler of each said bearing-coupling assembly is configured to allow said shaft-end fluid input to connect to said fluid reservoir line and receive fluids into a portion of said center shaft assembly;

said fluid input coupler of each said bearing-coupling assembly is configured for selectively attaching to said fluid reservoir line, allowing each bearing and said center shaft assembly to rotate relative to each said fluid input coupler, and containing a fluid input channel between said fluid reservoir line and said center shaft assembly;

each among said fluid reservoir line is configured to create a fluid connection between one among said two fluid reservoirs and said shaft-end fluid input;

said reel system is configured to selectively manage a plurality of lines associated with said foam spraying system;

said plurality of lines comprise a plurality of input lines and a plurality of output lines;

a plurality of input lines comprise a portion of said plurality of lines connected to said reel system outside of said two spool side members; and said plurality of output lines comprise a portion of said plurality of lines connected to said reel system inside of said two spool side members.

17. The reel system of claim 16, wherein:

said reel system is further configured to disengage by:

activating a belt drive assembly to wind up said plurality of lines.

18. The reel system of claim 16, wherein:

said reel system further comprises a locking assembly configured to selectively hold said spool portion in one rotary position and prevent spinning; and said locking assembly comprises a locking pin being adapted to selectively slide through one among one or more locking apertures in either said second spool side member or said first spool side member.

* * * * *